Oct. 18, 1960 H. O. KOPLIN 2,956,837
SEATING ARRANGEMENT FOR VEHICLE BODIES
Filed Sept. 13, 1957 2 Sheets-Sheet 2
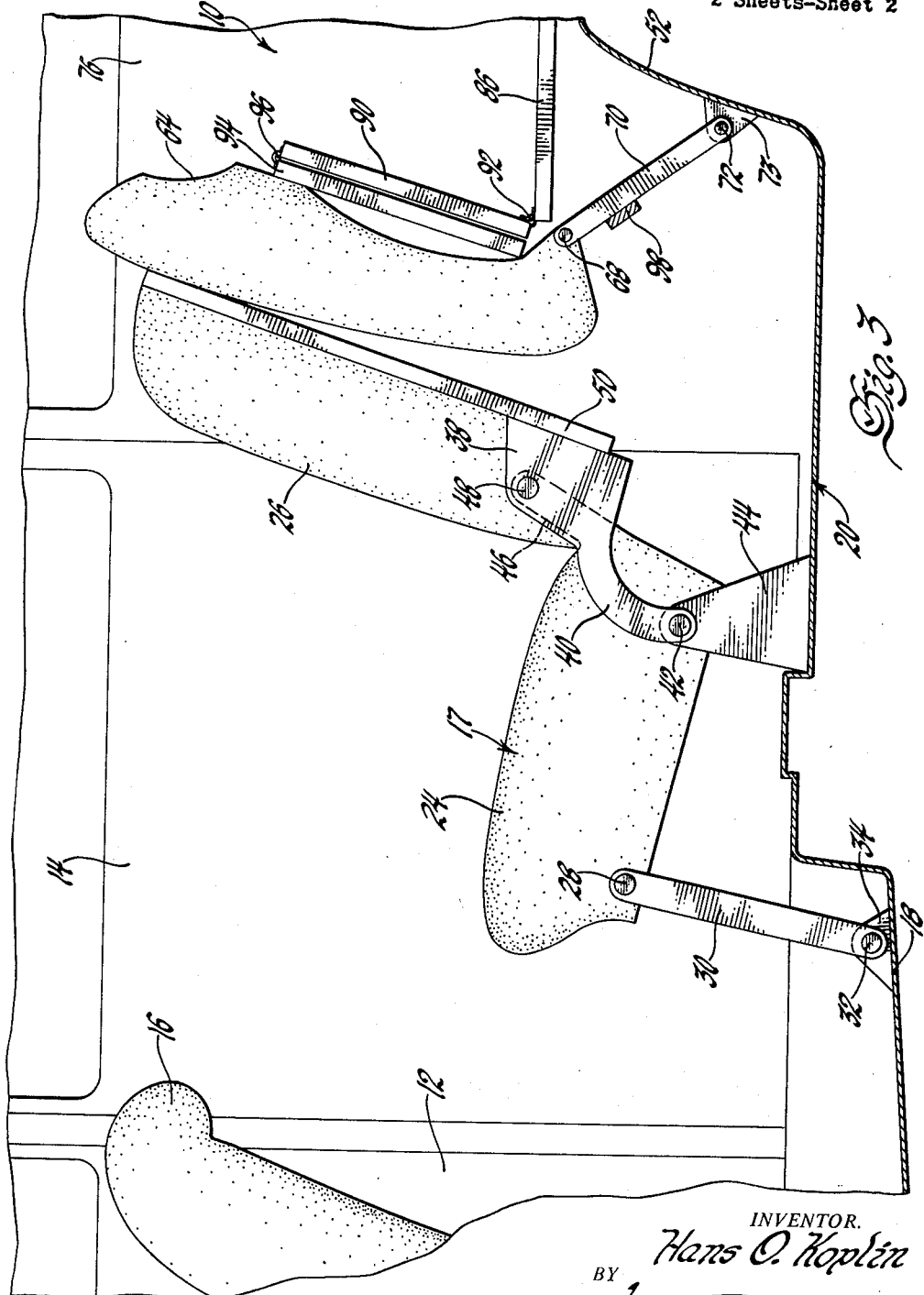
INVENTOR.
Hans O. Koplin
BY
W. S. Pettigrew
ATTORNEY

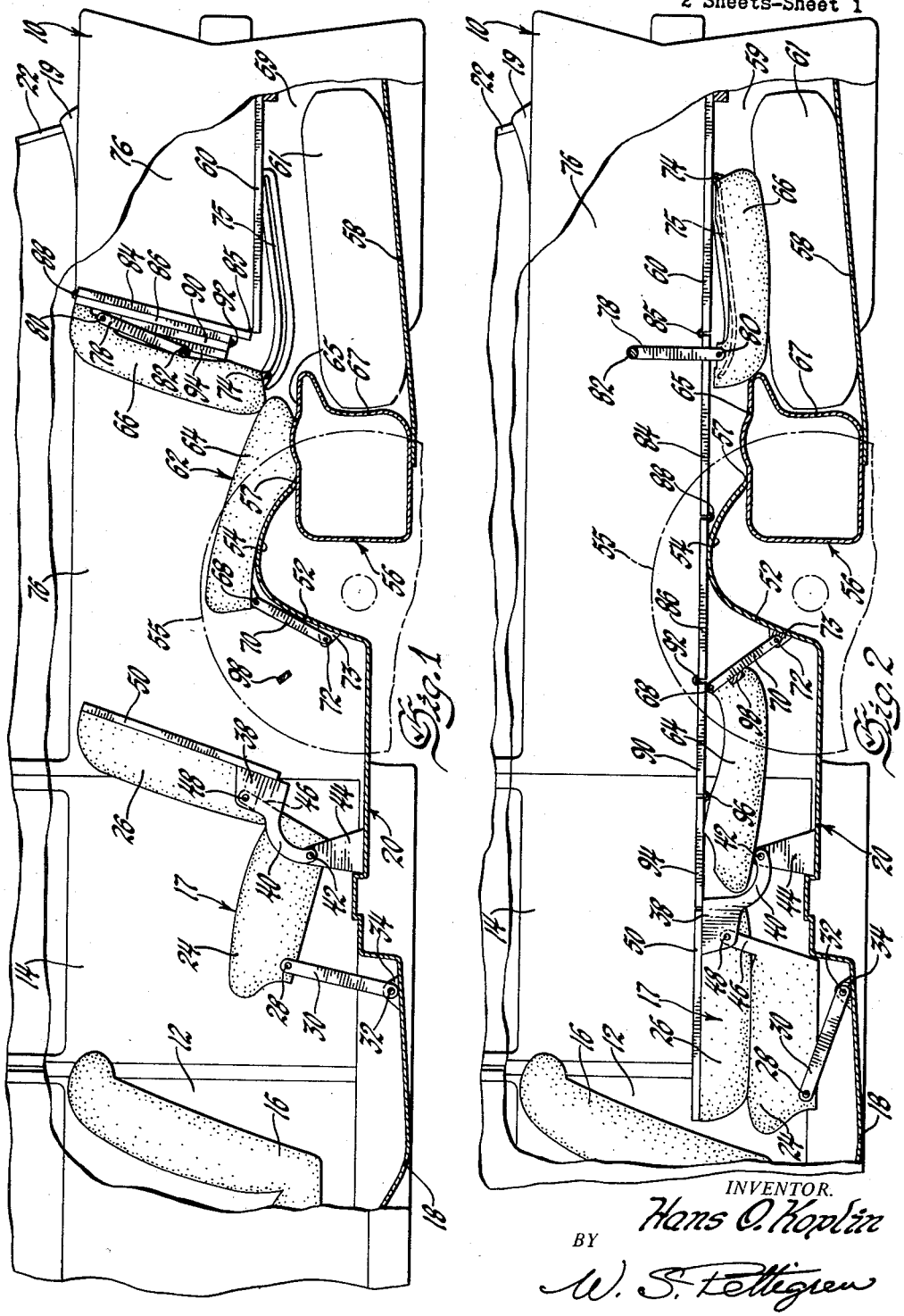

United States Patent Office 2,956,837
Patented Oct. 18, 1960

2,956,837

SEATING ARRANGEMENT FOR VEHICLE BODIES

Hans Otto Koplin, Center Line, Mich., assignor to General Motors Corporation, Detroit, Mich., a corporation of Delaware Filed Sept. 13, 1957, Ser. No. 683,762

6 Claims. (Cl. 296—66)

This invention relates to seating arrangements for vehicle bodies and more particularly to foldable seating arrangements for vehicle bodies.

The seating arrangement of this invention is intended primarily for use in multi-purpose vehicle bodies, such as station wagon bodies, which are used for both passenger and load carrying purposes. The seating arrangement for station wagon bodies usually includes a front or driver's seat and a second passenger seat disposed rearwardly of the driver's seat and foldable between a normal upright position and a folded position when the body is converted for load carrying purposes. When the second seat is in folded position, the seat bottom is shifted forwardly and the seat back is folded over the seat bottom to provide a spaced continuation of the rear floor section which is elevated with respect to the forward floor section to provide clearance for the rear wheel and axle structure of the body.

In the past, third seats have often been mounted on the rear floor section, but these seats have often been of the type which had to be bodily removed from the station wagon body when it was desired to use the body for load carrying purposes.

The seating arrangement of this invention includes the front and foldable second passenger seats and further includes a foldable third passenger seat which may normally be used for passenger carrying purposes and which is easily foldable between normal position and a folded position wherein the seat back of this seat is located in a well within the rear floor section and the seat bottom is disposed in the space between the forward wall of the elevated rear floor section and the folded second seat. A number of foldable floor sections or panels are swingably mounted on the rear floor section adjacent the opening to the well therein, and these panels may be unfolded when the third seat is in folded position so as to cover the opening of the well and to extend forwardly of the body above the third seat bottom to the second seat back. This provides a substantially unbroken load carrying floor space from the rear opening of the body to the rear of the front seat back.

If less load carrying floor space is needed or if the second seat is needed for passenger carrying purposes, the third seat bottom may be disposed forwardly of the rear elevated floor section adjacent the upright second seat back and the foldable panels may only be partially unfolded so as to cover the opening of the well and the space between the rear elevated floor section and the third seat bottom. Thus, the third seat may be disposed in either of two folded positions, depending on whether the second seat remains in normal position or is disposed in folded position. By providing a third seat of this type in conjunction with a foldable second seat, the utility of station wagon bodies is greatly increased since only that amount of floor space to the rear of the front seat which is necessary for the particular load carrying purpose may be selected without having to fold the second seat in all instances.

The primary object of this invention is to provide an improved seating arrangement for multi-purpose vehicle bodies. Another object of this invention is to provide an improved seating arrangement for multi-purpose vehicle bodies which includes a number of seats foldable between a normal position and a folded position to provide a substantially unbroken load carrying floor space from the rear opening of the body to the front seat. A further object of this invention is to provide an improved third seat arrangement for multi-purpose vehicle bodies which is foldable between a normal position and a folded position wherein the seat is disposed in an out of the way position.

These and other objects of this invention will be readily apparent from the following specification and drawings wherein:

Figure 1 is a partial side elevational view of a station wagon body of the type including a front or driver's seat, a second passenger seat, and a third passenger seat according to this invention, with the second and third passenger seats being shown in their normal upright position for passenger carrying purposes.

Figure 2 is a view similar to Figure 1 and showing the second and third seats in their folded position when the portion of the body to the rear of the front seat is converted for load carrying purposes.

Figure 3 is an enlarged view of a portion of Figure 1 and showing the second seat in normal position and the third seat bottom in a folded position when only the portion of the body to the rear of the second seat is converted for load carrying purposes.

Referring now to Figure 1 of the drawings, a station wagon body 10 includes a front door 12 and a rear door 14 on either side thereof which are movable between closed position, as shown, and open position providing access to and exit from the front or driver's seat 16 and the second passenger seat 17. The front seat 16 is of a common type of full seat which spans the body transversely thereof and may be adjustable in either horizontal or vertical directions by suitable seat adjusting means supported on the forward floor pan section 18 of the body floor pan 20. The rear of the body usually includes a tail gate 19 which is swingable downwardly with respect to the body and a lift gate 22 which is swingable upwardly with respect to the body to provide access to and exit from the body to the rear of the second seat 17.

The second seat 17 includes a seat bottom 24 and a seat back 26. Bottom 24 is pivoted at 28 adjacent either side thereof to one end of a link 30, with the other end of the link being pivoted at 32 to a bracket 34 which is fixed in a suitable manner to the floor pan section 18. A bracket 38 is fixed to the seat back 26 adjacent either side thereof and includes a depending arcuate extension 40 which is pivoted at 42 to a bracket 44 fixed in a suitable manner to the floor pan section 18. The seat bottom 24 includes an upwardly extending arm 46 at either rear side thereof which is pivoted at 48 to the bracket 38. A panel or floor section 50 is secured to the back of the seat back 26.

The second seat 17 is shown in normal position in Figure 1 and in folded position in Figure 2. When the seat is moved from normal to folded positions, the front portion of the seat bottom 24 moves forwardly and downwardly as links 30 swing forwardly about pivots 32. The seat back 26 moves forwardly and downwardly about its pivots 42 on either side thereof to fold over the seat bottom as the rear portion of the seat cushion moves forwardly and downwardly due to the pivotal connections 48 between the seat bottom 24 and the seat back 26.

As is well known, the second seat 17 may either be of the full type or of the split type wherein the seat may be split into half sections or may be split into ⅔–⅓ sections. Since the linkage supporting the seat is the same on either side thereof, it will make no difference whether the seat is of the full type or the split type, except that additional linkages will have to be provided intermediate the seat sections for folding each section independently of the other if the seat is of the split type.

As can be clearly seen in Figure 1 of the drawings, the floor pan 20 includes a rearward upwardly extending wall 52 which merges into an elevated rear floor section 54 providing clearance for the rear wheel and axle structure of the vehicle, indicated schematically at 55. If desired, a fuel tank 56 may be disposed beneath the elevated floor section 54 and may be rigidly secured thereto in a suitable manner at 57. A panel 58 extends from the lower wall of the fuel tank to the rear of the body and defines the lower wall of a well 59 with the upper wall of the well being defined by an elevated rear floor section 60. If desired, a tire 61 may be disposed within this well and may rest on the panel 58.

The third seat 62 includes a seat bottom 64 and a seat back 66. The lower portion of the seat bottom 64 is contoured to the contour of floor section 54 and the adjacent upper wall portion 65 of the fuel tank 56 so as to rest thereon when in normal position as shown.

The upper wall portion 65 of the fuel tank may be considered a continuation of the rear floor pan section 54 for all purposes. In certain bodies the fuel tank 56 may be dispensed with, and in such instances the wall portion 65 and the adjacent rear wall 67 of the fuel tank may be part of the floor structure.

The forward portion of the seat bottom 64 is pivoted at 68 at either side thereof to a link 70 having its other end pivoted at 72 to a bracket 73 secured in a suitable manner to the wall 52 adjacent the juncture of the wall with the forward floor section 18. The third seat back 66 includes a guide roller 74 at either lower side thereof which is slidable within a guide channel 75 provided in each of the body side walls 76. A link 78 is pivoted at one end thereof at 80 to each side of the seat back and the other end of the link is pivoted at 82 to the body side wall 76.

A number of foldable panels are normally disposed in folded position to the rear of the third seat back. These panels include a panel 84 pivoted at 85 to the edge portion of floor section 60, a panel 86 pivoted at 88 to panel 84, a panel 90 pivoted at 92 to panel 86, and a panel 94 pivoted at 96, Figure 2, to panel 90.

As previously mentioned, the third seat bottom 64 may be moved to either of two positions, depending on whether the second seat 17 is in normal position or in folded position so as to select the amount of floor space necessary for the particular load carrying purpose. Referring now particularly to Figures 1 and 2 of the drawings, when it is desired to move the third seat 66 to folded position, the seat back is moved forwardly as links 78 swing about their pivots 82 on the body side walls; and, at the same time, the seat is moved downwardly and rearwardly as the guide rollers 74 move in the guides 75. Thus, the seat back may be stowed away within the well 59 above the tire 61. If it is desired to have an unbroken expanse of floor space from the rear opening of the body to the rear of the front seat 16, the second seat 17 is moved to a folded position, as previously described and as shown in Figure 2. Thereafter the third seat bottom 64 is moved forwardly as the links 70 swing about their pivots 72 and is disposed in an upside down position, as shown in Figure 2, with the rear portion of the seat cushion resting on the brackets 44 so as to locate the seat in the space between the second seat back and the wall 52 of the floor pan 20. Suitable stops 98 are provided on the body side walls 76 to limit the forward swinging of the links 70. The panels are then unfolded, with panel 84 being located above the entrance to the well 59 and above the upper wall portion 65 of the fuel tank 56, panel 86 resting on the rear floor section 54, panel 90 being located above the third seat bottom 64, and panel 94 resting on the third seat bottom 64 and also resting on the second seat back 26 and fitting substantially flush with the panel 50 on the rear of the second seat back. Thus, a continuous unbroken floor space is provided between the rear of the body and the rear of the front seat 16.

If less floor space is needed for load carrying purposes or if the second seat 17 is needed for passenger carrying purposes, the third seat bottom may be folded in a different manner, as will now be described with reference to Figure 3. When the second seat is in upright position, the third seat cushion 64 is moved forwardly as the links 70 swing about their pivots 72 into engagement with the stops 98 so that the third seat bottom rests against the panel 50 on the second seat back 26. Thereafter panels 84 and 86 are unfolded, as described in conjunction with Figure 2, but panels 90 and 94 are not unfolded with respect to each other so that they bear against the lower surface of the third seat bottom. Thus, a smaller amount of floor space for load carrying purposes is provided to the rear of the second seat back.

Thus, this invention provides an improved foldable second and third seat arrangement for multi-purpose vehicle bodies which allows the body to be used for both passenger and load carrying purposes without requiring the third seat to be bodily removed from the body whenever the body is used for load carrying purposes. The third seat may further be located in either of two folded positions, depending on whether it is necessary to use the second seat for passenger carrying purposes or whether a smaller amount of load carrying floor space is necessary. By providing a seat arrangement of this type and also a foldable third seat which may be located in either of two positions, the station wagon or other multi-purpose body may be utilized for both passenger and load carrying purposes and the operator may also select only that amount of floor space necessary for the particular load carrying purpose.

I claim:

1. In a vehicle body, a floor including a lower floor section and an elevated portion joined thereto by a generally upright wall, a well below and adjacent to said elevated portion and opening to said elevated portion, a seat back, means supporting said seat back on said body for bodily shiftable movement between a generally upright position adjacent said well and a stored position entirely within said well, a seat bottom normally resting on said elevated portion, means supporting said seat bottom on said body for movement between said normal position thereof and a stored position wherein said seat bottom is disposed above said lower floor section adjacent and forward of said wall, and foldable means supported on said body adjacent the entrance to said well for movement between a folded position when said seat bottom and seat back are in normal position and an unfolded position when said seat bottom and back are in stored position wherein said means are disposed above the entrance of said well and above said elevated portion to provide a load carrying floor.

2. In a vehicle body, a floor including a lower floor section, an elevated portion joined thereto by a generally upright wall and an elevated floor section spaced from said portion, a well below said elevated floor section and opening between said elevated floor section and said portion, a seat back, means supporting said seat back on said body for bodily shiftable movement between a generally upright position adjacent said well and a stored position entirely within said well, a seat bottom normally resting on said portion, means supporting said seat bottom on said body for movement between said normal position thereof and a stored position wherein said seat bottom is disposed above said lower floor section adjacent and forward of said wall, and foldable means supported on said elevated floor section adjacent the entrance to said well for movement between a folded position when said seat bottom and seat back are in normal position and an unfolded position when said seat bottom and back are in stored position wherein said means are disposed above the entrance of said well and above said elevated portion to provide a continuation of said elevated floor section.

3. In a vehicle body, a floor including a lower floor section, an elevated portion joined thereto by a generally upright wall and an elevated floor section spaced from said portion, a well below said elevated floor section and opening between said elevated floor section and said elevated portion, a seat back, means supporting said seat back on said body for bodily shiftable movement between a generally upright position adjacent said well and a stored position entirely within said well, a seat bottom normally resting on said elevated portion, means supporting said seat bottom on said body for movement between said normal position thereof and a stored position wherein said seat bottom is disposed above said lower floor section adjacent and forward of said wall on the general level of said elevated portion, and foldable means supported on said body adjacent the entrance to said well for movement between a folded position when said seat bottom and seat back are in normal position and an unfolded position when said seat bottom and back are in stored position wherein said means are disposed above the entrance of said well and above said elevated portion and seat bottom to provide a continuation of said elevated floor section.

4. In a vehicle body, a floor including a lower floor section, an elevated portion joined thereto by a generally upright wall and an elevated floor section spaced from said elevated portion, a well below said elevated floor section and opening between said elevated floor section and said elevated portion, a seat back, means supporting said seat back on said body for bodily shiftable movement between a generally upright position adjacent said well and a stored position entirely within said well, a seat bottom normally resting on said elevated portion, means supporting said seat bottom on said body for movement between said normal position thereof and a stored position wherein said seat bottom is disposed above said lower floor section adjacent and forward of said wall, and a number of foldable panels supported on said body adjacent the entrance to said well for movement between a folded position when said seat bottom and seat back are in normal position and an unfolded position when said seat bottom and back are in stored position wherein said panels are disposed in aligned relationship above the entrance of said well and above said elevated portion to provide a continuation of said elevated floor section.

5. In a vehicle body, a floor including a lower floor section, an elevated portion joined thereto by a generally upright wall and an elevated floor section spaced from said elevated portion, a well below said elevated floor section and opening between said elevated floor section and said elevated portion, a first seat mounted on said lower floor section and including a seat bottom and a seat back spaced from said wall, a second seat back, means supporting said second seat back on said body for bodily shiftable movement between a generally upright position adjacent said well and a stored position entirely within said well, a second seat bottom normally resting on said elevated portion, means supporting said second seat bottom on said body for movement between said normal position thereof and a stored position wherein said seat bottom is disposed in an upright position adjacent said first seat back in spaced relationship to said wall, and foldable means supported on said body adjacent the entrance to said well for movement between a folded position when said second seat bottom and seat back are in normal position and an unfolded position when said second seat bottom and back are in stored position wherein said means are disposed above the entrance of said well and above said elevated portion to provide a continuation of said elevated floor section to said first seat bottom.

6. In a vehicle body, a floor including a lower floor section, an elevated portion joined thereto by a generally upright wall and an elevated floor section spaced from said elevated portion, a well below said elevated floor section and opening between said elevated floor section and said elevated portion, a first seat mounted on said lower floor section and including a seat bottom and a seat back, means supporting said seat back on said body for movement between a generally upright position and a folded position over said seat bottom wherein said seat back provides a spaced continuation of said elevated floor section and is spaced from said wall, a second seat back, means supporting said second seat back on said body for bodily shiftable movement between a generally upright position adjacent said well and a stored position entirely within said well, a second seat bottom normally resting on said elevated portion, means supporting said second seat bottom on said body for movement between said normal position thereof and a stored position wherein said seat bottom is disposed above said lower floor section between said first seat back and said wall when said first seat back is in folded positon, and a number of foldable panels supported on said body adjacent the entrance to said well for movement between a folded position when said second seat bottom and seat back are in normal position and an unfolded position when said second seat bottom and back are in stored position wherein said panels are disposed in aligned relationship above the entrance of said well, above said elevated portion, and above said elevated seat bottom to provide a continuation of said second floor section to said first seat back.

References Cited in the file of this patent

UNITED STATES PATENTS

| | | |
|---|---|---|
| 2,152,505 | Stuart | Mar. 28, 1939 |
| 2,502,061 | Radford | Mar. 28, 1950 |
| 2,677,574 | Golubics | May 4, 1954 |
| 2,710,769 | Rosenthal | June 14, 1955 |

FOREIGN PATENTS

| | | |
|---|---|---|
| 106,977 | Australia | Mar. 30, 1939 |
| 107,131 | Australia | Apr. 20, 1939 |
| 928,506 | Germany | June 2, 1955 |
| 881,601 | France | Jan. 28, 1943 |